United States Patent
Schultz et al.

(10) Patent No.: US 10,077,834 B2
(45) Date of Patent: Sep. 18, 2018

(54) HYDRAULIC CONTROL SYSTEM FOR A TRANSMISSION

(71) Applicant: GM GLOBAL TECHNOLOGY OPERATIONS LLC, Detroit, MI (US)

(72) Inventors: John C Schultz, Saline, MI (US); Robert L Moses, Ann Arbor, MI (US); Derek F Lahr, Howell, MI (US); Shushan Bai, Ann Arbor, MI (US)

( * ) Notice: Subject to any disclaimer, the term of this patent is extended or adjusted under 35 U.S.C. 154(b) by 201 days.

(21) Appl. No.: 15/235,183

(22) Filed: Aug. 12, 2016

(65) Prior Publication Data

US 2018/0045302 A1    Feb. 15, 2018

(51) Int. Cl.
*F16H 61/00* (2006.01)
*F16K 11/07* (2006.01)
*F16K 15/04* (2006.01)
*G05D 16/10* (2006.01)

(52) U.S. Cl.
CPC .......... *F16H 61/0025* (2013.01); *F16K 11/07* (2013.01); *F16K 15/04* (2013.01); *G05D 16/106* (2013.01)

(58) Field of Classification Search
CPC ............. F16H 57/0445; F16H 61/0021; F16H 61/0025
USPC .......................... 60/421, 428, 429, 484, 486
See application file for complete search history.

(56) References Cited

U.S. PATENT DOCUMENTS

| | | | | |
|---|---|---|---|---|
| 6,669,598 B2 * | 12/2003 | Berger | ............. | F16H 61/66272 477/45 |
| 7,785,083 B2 * | 8/2010 | Mamei | ................. | F04B 49/007 417/213 |
| 8,042,331 B2 | 10/2011 | Schultz et al. | | |
| 2006/0175239 A1 * | 8/2006 | Johnson | ................. | B01D 35/02 210/232 |
| 2012/0199217 A1 * | 8/2012 | Long | ................... | F16H 61/0025 137/468 |
| 2015/0030472 A1 * | 1/2015 | Wi | ...................... | F16H 61/0025 417/286 |
| 2015/0068340 A1 * | 3/2015 | Wi | ...................... | F16H 61/0025 74/473.11 |
| 2015/0075151 A1 * | 3/2015 | Wi | ...................... | F16H 61/0025 60/464 |
| 2015/0075152 A1 * | 3/2015 | Wi | ...................... | F16H 61/0025 60/464 |
| 2015/0075153 A1 * | 3/2015 | Wi | ...................... | F16H 61/0025 60/464 |
| 2015/0075154 A1 * | 3/2015 | Wi | ...................... | F16H 61/0025 60/464 |
| 2016/0178052 A1 * | 6/2016 | Lundberg | ............ | F16H 61/0025 137/565.16 |
| 2017/0009877 A1 * | 1/2017 | Ichimura | ............. | F16H 61/0206 |
| 2017/0306988 A1 * | 10/2017 | Guo | ........................ | F15B 11/16 |

* cited by examiner

*Primary Examiner* — F. Daniel Lopez
*Assistant Examiner* — Matthew Wiblin

(57) ABSTRACT

A dual pressure pump system for a transmission includes a dual pressure pump having a first pump outlet and a second pump outlet, and a pressure regulator valve defining a first chamber in fluid communication with the first pump outlet and a second chamber in fluid communication with the second pump outlet. The pressure regulator valve is configured to selectively connect the first chamber with a first pressure line operating at a first greater-than-zero pressure and to selectively connect the second chamber to a second pressure line operating at a second greater-than-zero pressure.

14 Claims, 4 Drawing Sheets

HYDRAULIC CONTROL SYSTEM FOR A TRANSMISSION

FIELD

The present disclosure relates to a pump system for a transmission and method of operation.

INTRODUCTION

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Modern motor vehicle automatic transmissions use hydraulic fluid (transmission fluid) to operate. The fluid is used in various components within each transmission and the control of the fluid to those components is achieved by a valve body, or a plurality of valve bodies that direct the fluid through various passageways to those components. For example, the fluid may be supplied to pulley pistons in a continuously variable transmission, clutches, brake actuators, and the like. This fluid may also be used to lubricate and/or to manage heat within the transmission.

These transmissions rely upon a pump system to provide the fluid to the valve system which then can selectively provide the fluid to the various components. Extensive research and development is undertaken to reduce the cost and optimize the performance of these pump systems. For example, simplifying the pumps to reduce weight and cost, reducing the size to improve packaging, improving low speed performance, improving low temperature performance, and reducing energy loss have been areas of development and improvement.

Typically, a fixed displacement pump is driven in a manner that the flow from that pump is proportional to the speed of the engine. The minimum pump size is often constrained based upon the pressure and flow rate demands of the components of the transmission which may be required to operate during engine low speed or idle conditions. For example, a vehicle may be stopped or parked and the transmission may be shifted from the park mode to a drive mode. Because friction forces inside the pump generally increase as the size of the pump increases, higher displacement pumps often have higher parasitic energy loss than smaller displacement pumps. While a higher displacement pump may provide a sufficient flow at low engine speeds, a higher displacement pump may provide greater than necessary flow at higher engine speeds along with higher energy consumption (parasitic loss). This leads to a reduction in overall transmission efficiency and a concomitant reduction in fuel economy.

U.S. Pat. No. 8,042,331, which is incorporated herein in its entirety, discloses a hydraulic pump system for a transmission. An exemplary system disclosed by that patent includes a balanced vane binary pump. The hydraulic system is connected with first and second discharge ports of the pump and is operable to selectively permit fluid flow through both discharge ports (full displacement or full volumetric output of the pump) or permit flow through only the first discharge port (i.e., partial displacement or partial volumetric output of the pump). Operating the pump at partial output requires less torque and less horsepower to operate the pump, which leads to better fuel economy during steady-state operation. A binary fixed displacement pump can offer the faster response required to enable control of the transitions between partial output during steady-state operation of the transmission and the full output required during transient events such as transmission shifts.

SUMMARY

A dual pressure pump system for a transmission includes a dual pressure pump having a first pump outlet and a second pump outlet pressure regulator valve defining a first chamber in fluid communication with the first pump outlet and a second chamber in fluid communication with the second pump outlet. The pressure regulator valve is configured to selectively connect the first chamber with a first pressure line operating at a first greater-than-zero pressure and to selectively connect the second chamber to a second pressure line operating at a second greater-than-zero pressure. In this manner, over pressurizing the transmission fluid is avoided, pump size may be reduced, pressure differential within the pump may be reduced, which may improve the efficiency of the pump system and overall fuel economy.

In another aspect, the pressure regulator valve includes an elongate housing and an axially slidable spool that is axially slidable within the elongate housing to selectively connect the first chamber with the first pressure line operating at the first greater-than-zero pressure and to selectively connect the second chamber to the second pressure line operating at the second greater-than-zero pressure.

In another aspect, the first chamber is defined within the elongate housing and between a first land and second land of the axially slidable spool, and the second chamber is defined within the elongate housing and between a third land and a fourth land of the axially slidable spool.

In another aspect, the elongate housing further defines a first exhaust port in communication with the first greater-than-zero pressure line, and the position of the axially slidable spool selectively connects the first chamber with the first exhaust port.

In another aspect, the elongate housing further defines a second exhaust port in communication with the second greater-than-zero pressure line, and the position of the axially slidable spool selectively connects the second chamber with the second exhaust port.

In another aspect, the system further includes a ball-check valve selectively connecting the second pump outlet in fluid communication with the first chamber.

In another aspect, the pressure regulator valve is configured to selectively connect the first chamber with the second pressure line operating at a second greater-than-zero pressure.

In another aspect, the pressure regulator valve is configured to selectively connect the first chamber with a transmission sump.

Further areas of applicability of the present disclosure will become apparent from the detailed description provided hereinafter. It should be understood that the detailed description and specific examples are intended for purposes of illustration only and are not intended to limit the scope of the disclosure.

The above features and advantages, and other features and advantages, of the present invention are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

Figure 1:
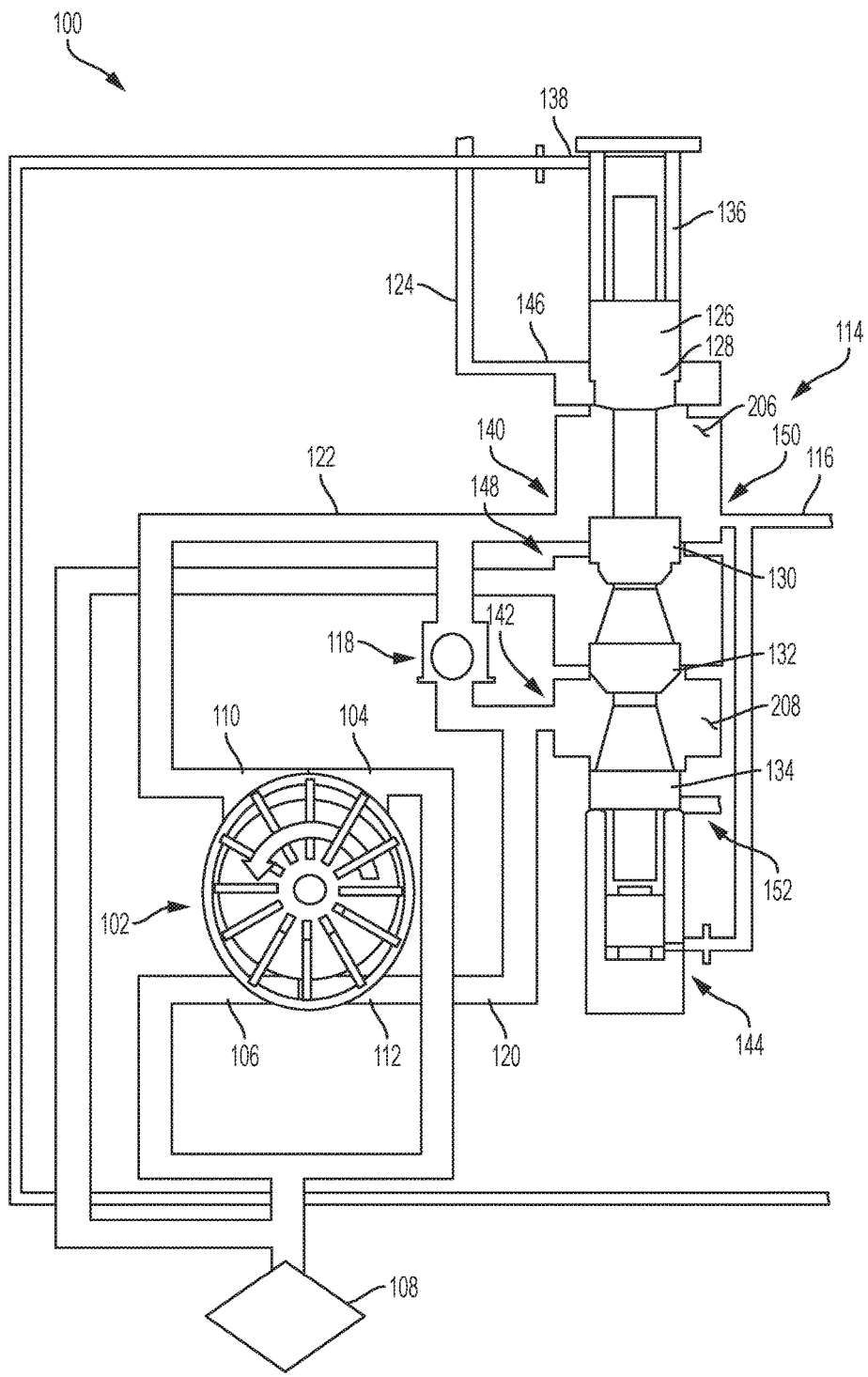
FIG. 1 is a schematic illustration of a hydraulic pump system for a transmission.

FIG. 1 schematically illustrates the oil flow through a hydraulic pump system 100 for providing hydraulic pressure to a transmission for cooling, lubrication, and clutch actuation. The system 100 includes a binary pump 102 that is driven by a prime mover (not shown), for example, an internal combustion engine, an electric motor, and/or the like without limitation. The pump includes a first pump inlet 104 and a second pump inlet 106 that draw fluid from a transmission sump 108 through a filter (not shown). The binary pump 102 has two separate outlets, including a first discharge port 110 and a second discharge port 112. The first discharge port 110 is in communication with a pressure regulator valve 114 via a primary pressure line 122. The second discharge port 112 is in communication with a ball check valve 118 and the pressure regulator valve 114. The second discharge port 106 is in communication with the pressure regulator valve 114 via a secondary pressure line 120.

The two inlets, 104 and 106, and two outlets, 110 and 112, are shown extending from the pump. The two inlets may be positioned 180 degrees opposite one another and the two outlets, 110 and 112, located 180 degrees opposite one another such that the pump may be balanced. Because the pump is engine-driven, when engine speed increases the volume of fluid being supplied by the pump also increases. When the output from the binary pump 102 reaches a calibrated threshold, the ball check valve 118 will allow feedback pressure of the primary pressure line 122 to close the ball check valve 118, ceasing fluid flow from the secondary pressure line 120 into the primary pressure line 122 and routing that back to pump inlets 104 and 106 at near zero pressure. In this condition, pump 102 is operating at only partial output or displacement. Prior to the calibrated threshold, the ball check valve 118 remains open and both outlets provide fluid to the transmission through first pressure line 116 and the second pressure line 124.

Pressure regulator valve 114 has an elongate housing which receives an axially sliding spool 126 that includes a plurality of axially spaced apart lands: a first land 128, a second land 130, a third land 132, and a fourth land 134. The pressure regulator valve 114 further includes a compression spring 136 that biases the spool 126 downwardly in the figure. The elongate housing defines or includes a signal inlet port 138, a first inlet port 140, a second inlet port 142, a first pressure line feedback port 144, a first exhaust port 146, a second exhaust port 148, a third exhaust port 150, and a fourth exhaust port 152. A primary discharge outlet 110 from the binary pump 102 is in fluid communication with the first inlet port 140 via a primary pressure line 122 and a secondary discharge outlet 112 through the secondary pressure line 120 communicates with the second inlet port 142 and the first inlet port 140 (via a ball check valve 118 and the primary line 122).

Figure 2:
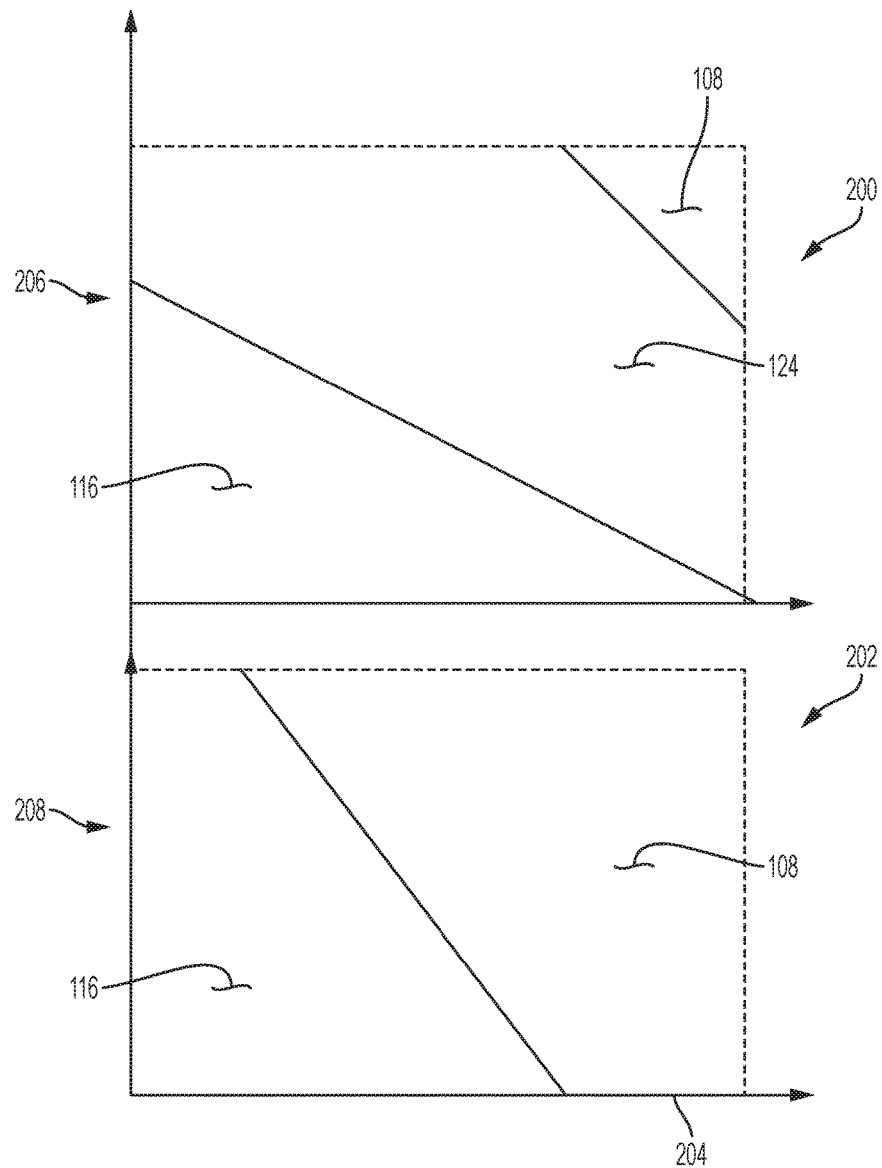
FIG. 2 includes two graphs illustrating flow through a pressure regulator valve of FIG. 1.

Operation of the hydraulic pump system 100 will now be explained with reference to FIGS. 1 and 2. FIG. 2 includes two separate graphs 200 and 202 that represent the position of the axially sliding spool 126 along the horizontal axis 204 along with the relative, resultant flow from the pressure regulator valve 114 from a first chamber 206 and a second chamber 208 being represented by the area vertically extending above the horizontal axis. First chamber 206 is defined by the space within the elongate housing of the pressure regulator valve 114 between the first land 128 and the second land 130 and the second chamber 208 is defined by the space within the elongate housing between the third land 132 and the fourth land 134.

The position of the axially sliding spool 126 shown in FIG. 1 corresponds to the left most position along the axis 204. In this position, a portion of the fluid in the first chamber 206 flows to the first pressure line 116 and another portion of that fluid flows to the second pressure line 124. Simultaneously, all of the fluid from the second chamber 208 flows to the first pressure line 116. Thus, in this position of the axially sliding spool 126, both the first chamber 206 and second chamber 208 are in communication with the first pressure line 116 and, as a result, provide fluid at the pressure required by the first pressure line 116. This condition exists when the prime mover operates at a low speed, idle speed, or the like which means that the binary pump 102 also operates at a low speed. However, as explained above, despite the prime mover operating at a low speed, the transmission may continue to require a minimum flow level to maintain operability. This minimum required flow rate and minimum operating speed of the pump places a lower limit upon the capacity or size of the pump such that the pump is capable of providing the demanded flow at the low speed.

Typically, and in the example illustrated, the first pressure line 116 and the second pressure line 124 may require or demand different pressures and/or volumes of flow. For example, first pressure line 116 may provide fluid to transmission components which operate at, and therefore require, higher pressures than those components supplied by the second pressure line 124. In one typical example, the second pressure line 124 may provide fluid for cooling and/or lubrication purposes which may not require as high a pressure and/or flow as that demanded or required by the operating transmission components supplied by the first pressure line 116. Since the first chamber 206, supplies the first pressure line 116, the first chamber 206 must operate at a pressure that is at least as high as that pressure required by the first pressure line 116. However, since the secondary pressure line 124 may require a lower pressure, the pressure regulator valve 114 must either regulate that pressure down, or the second pressure line 124 may require subsequent regulation to reduce the pressure to a usable level. Thus, the work and energy expended by the binary pump to raise the fluid to this higher pressure is wasted, resulting in a loss of transmission efficiency and lower fuel efficiency.

As prime mover speed increases and the speed of the binary pump correspondingly increases, the volume fluid provided by both sides of the pump increases. At some point, the volume of fluid provided by the pump exceeds that required by the components in the transmission. In response, the pressure of the fluid increases which causes the axially sliding spool 126 to move upwardly in FIG. 1 against the biasing force of the spring 136. This upward movement of the spool 126 corresponds to a rightward movement along axis 204 of FIG. 2. At a certain point, when the axially sliding spool 126 moves upwardly enough for the second chamber 208 to be in communication with second exhaust port 148 the supply of fluid flowing from the binary pump 102 to the second chamber 208 to return flow back to pump inlets 104 and 106 which typically operate at a lower pressure than either of the first pressure line 116 or second pressure line 124. This causes the pressure in the second chamber 208 to drop thereby causing the ball check valve 118 to close. Thus, in this condition, only one side of the binary pump provides a flow only back to the pump inlets 104 and 106 at low pressure. Although, this may reduce the work being performed by that side, this condition results in an expenditure of energy into a system which does not demand any flow at all. Further, this "idling" of one side of the pump results in clear diminishing in the utilization rate of the full capacity of the binary pump 102. As explained above, since only one side of the pump 102 either provides useful work or does not, this pump is known as a "binary" pump in that one side of the pump is either ON or OFF.

Additionally, in this condition, where only one side of the pump 102 is providing fluid, there is a pressure differential between the primary side of the pump 102 (corresponding to inlet 104 and outlet 110) and the secondary side of the pump 102 (corresponding to inlet 106 and outlet 112). This pressure differential results in a force being exerted against an axle supporting the rotating components of the pump. The rotating components and supporting structure must be capable of resisting this force resulting from this pressure differential without failing. The higher the pressure differential, the more substantial (heavier, larger and the like) the pump components must be in order to resist these forces which further reduces efficiency of the overall system and increases the required size of the pump.

Figure 3:
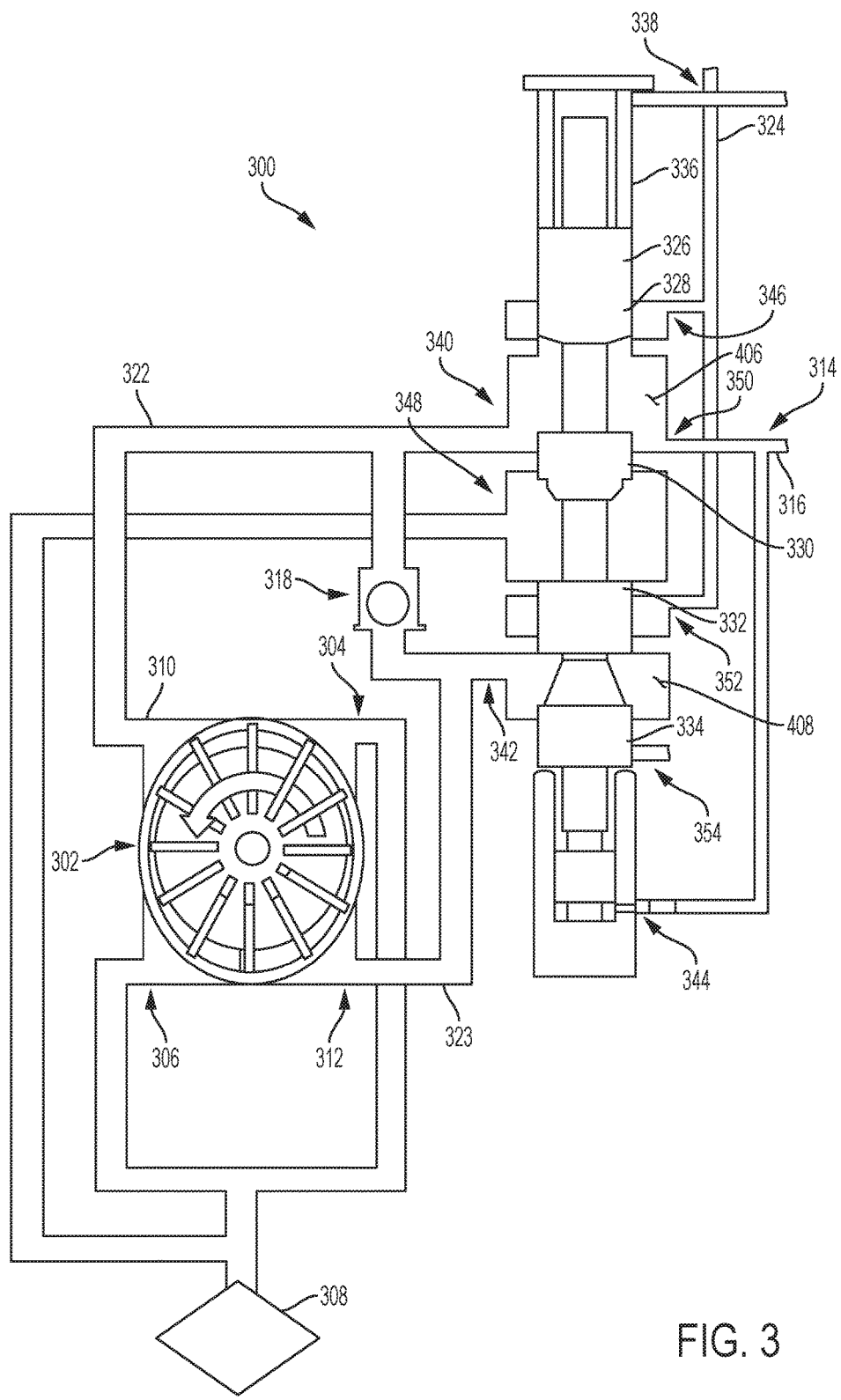
FIG. 3 is a schematic illustration of an exemplary hydraulic pump system for a transmission in accordance with an exemplary embodiment of the invention.

FIG. 3 is a schematic illustration of an exemplary hydraulic pump system 300 for a transmission in accordance with an exemplary embodiment of the invention. The system 300 includes a dual pressure pump 302 that is driven by a prime mover (not shown). A dual pressure pump 302 differs from a "binary" pump in that, both sides of the pump always provide fluid at a pressure that is non-zero. Thus, neither side of the dual pressure pump is ever "OFF" and not "binary." In contrast to the pump described in association with FIGS. 1 and 2, as will be described in more detail below, both sides of dual pressure pump 302 operate at a variable, non-zero pressure in accordance with that determined by pressure regulator valve 314.

The pump 302 includes a first pump inlet 304 and a second pump inlet 306 that draw fluid from a transmission sump 308. The binary pump 302 further includes a first discharge port 310 and a second discharge port 312. The first discharge port 310 is in communication with a novel pressure regulator valve 314 via a primary pressure line 322. The second discharge port 312 is in fluid communication with the pressure regulator valve 314 via a secondary pressure line 323 and via ball check valve 318 in fluid communication with the primary pressure line 322, respectively. The two inlets, 304 and 306, and two outlets, 310 and 312, may be positioned 180 degrees opposite one another and the two outlets, 310 and 312, located 180 degrees opposite one another such that forces within the pump may be radially balanced.

Pressure regulator valve 314 has an elongate housing which receives an axially sliding spool 326 that includes a plurality of axially spaced apart lands: a first land 328, a second land 330, a third land 332, and a fourth land 334. The pressure regulator valve 314 further includes a compression spring 336 that biases the spool 326 downwardly in the figure. The elongate housing defines or includes a signal inlet port 338, a first inlet port 340, a second inlet port 342, a first pressure line feedback port 344, a first exhaust port 346, a second exhaust port 348, a third exhaust port 350, a fourth exhaust port 352, and a fifth exhaust port 354. A primary discharge outlet 310 from the dual pressure pump 302 is in fluid communication with the first inlet port 340 via a primary line 322 and a secondary discharge outlet 312 from the dual pressure pump 302 is in fluid communication with the second inlet port 342 and the first inlet port 340 (via a ball check valve 318 and the primary line 322).

Figure 4:
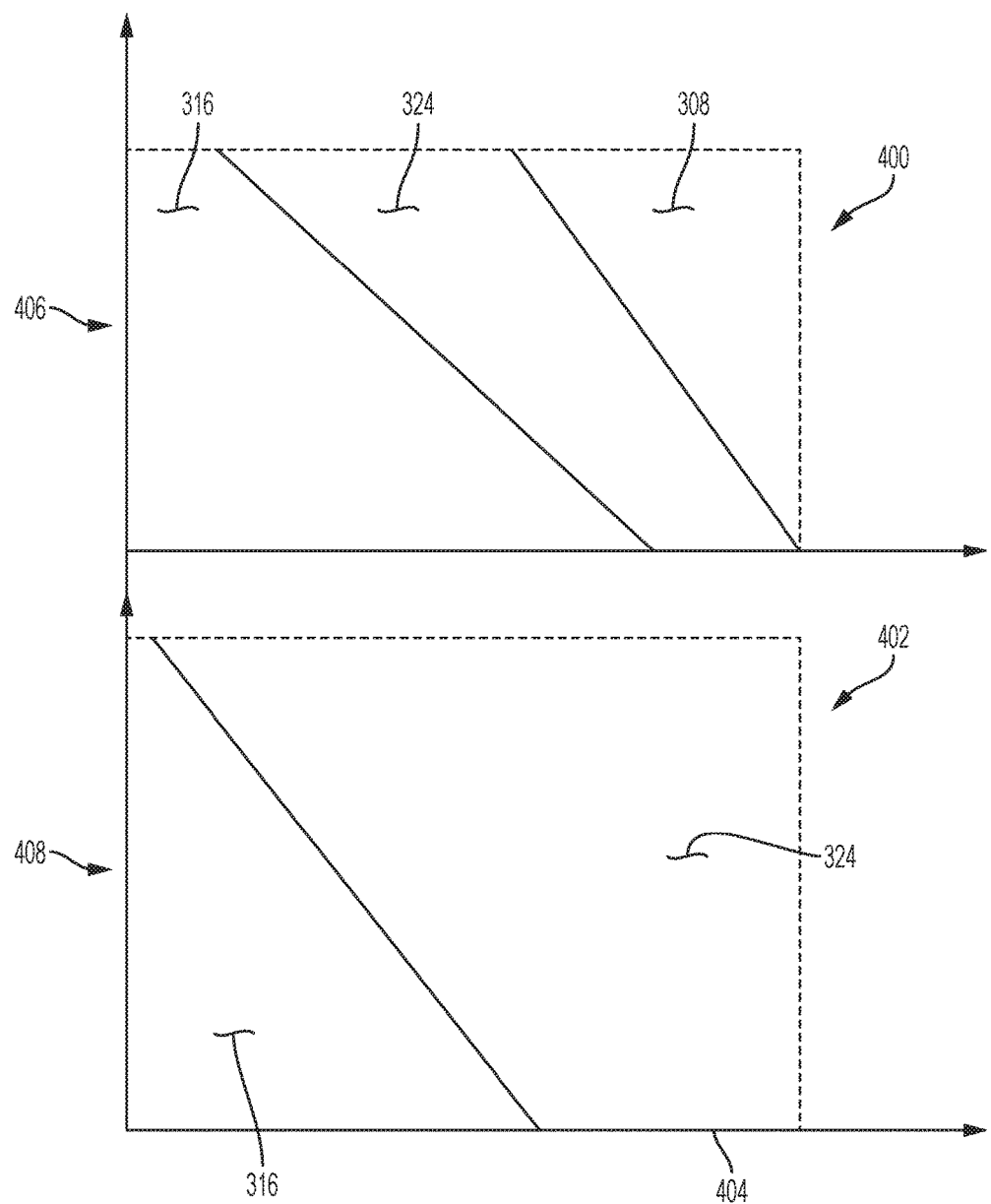
FIG. 4 includes two graphs illustrating flow through a pressure regulator valve of FIG. 3.

Operation of the hydraulic pump system 300 will now be explained with reference to FIGS. 3 and 4. FIG. 4 includes two separate graphs 400 and 402 that illustrates the position of the axially sliding spool 326 along the horizontal axis 404 along with the relative, resultant flow from the pressure regulator valve 314 from a first chamber 406 and a second chamber 408 being represented by the area extending vertically above the horizontal axis 404. First chamber 406 is defined by the space within the elongate housing between the first land 328 and the second land 330 and the second chamber 408 is defined by the space within the elongate housing between the third land 332 and the fourth land 334.

The position of the axially sliding spool 326 shown in FIG. 3 corresponds to the left most position along the axis 404. In this position, all of the fluid in the first chamber 406 flows to a first pressure line 316. Simultaneously, all of the fluid from the second chamber 408 also flows to the first pressure line 316. Thus, in this position of the axially sliding spool 326, both the first chamber 406 and second chamber 408 are in fluid communication with the first pressure line 316 and, as a result, provide fluid at the pressure required by the first pressure line 316. This condition exists when the prime mover operates at a low speed, idle speed, or the like which means that the dual pressure pump 302 also operates at a low speed. As explained above, despite the prime mover operating at a low speed, the transmission may continue to require a minimum flow level to operate. In this condition, with both the first and second chambers 406 and 408 providing a flow of fluid, the flow required by the transmission are met.

As the speed of the prime mover and corresponding speed of the dual pressure binary pump 302 increases, the output from the dual pressure pump 302 increases and, in response, the axially sliding spool 326 starts to move upward in FIG. 3 (not shown) which corresponds to moving to the right along horizontal axis 404 in FIG. 4. A portion of the fluid from the second chamber 408 starts to flow into the second pressure line 324 from the fourth exhaust port 352 before any portion of the fluid from first chamber 406 starts to flow into the second pressure line 324 from the first exhaust port 346. Thereby, ensuring an adequate flow of cooling, lubricating fluid. As the axially sliding spool 326 continues to move upward in FIG. 3 (to the right along horizontal axis 404), more of the fluid in the second chamber 408 flows into the second pressure line 324 until, eventually, all of the fluid from the second chamber 408 flows into the second pressure line 324. This is in stark contrast to the flow from the binary pump system illustrated and described above with reference to FIGS. 1 and 2, where none of the fluid from the second chamber 208 was provided to a second pressure line 124. In this manner, the hydraulic pump system 300 is able to take advantage of a significantly greater percentage of the capacity and utility of the dual pressure pump 302 and enabling both sides of the pump 302 to always perform useful work. In this condition, since both sides of the dual pressure pump 302 provide a flow to the secondary pressure line 324, it may be possible to reduce the size or overall capacity of the primary side and/or secondary side of the pump 302. With both sides providing a flow to the secondary pressure line, the primary side of the pump 302 need not supply all of the flow required by the secondary pressure line as was required by the pump system 100 of FIG. 1. A reduction in the size of the dual pressure pump 302 will reduce the energy demands of operating that pump by, for example, reducing friction and the like. This may result in a significant energy expenditure reduction and increase in efficiency.

Additionally, in contrast to the binary pump system of FIG. 1, the novel hydraulic system 300 results in a reduced pressure differential between the two sides of the pump 302. During higher speed operations, the secondary side of the pump (corresponding to inlet 306 and outlet 312) operate at a higher than sump system pressure. Thus, the pressure differential is reduced and the resulting forces that must be accommodated within the pump due to the pressure differential are reduced. Which results in the ability to further reduce the size of the structure which supports the operation within the pump which, in response, results in even lower operating energy requirements.

While the best modes for carrying out the invention have been described in detail, those familiar with the art to which this invention relates will recognize the various alternative designs and embodiments for practicing the invention within the scope of the appended claims.

What is claimed is:

1. A dual pressure pump system for a transmission comprising:
    a dual pressure pump having a first pump outlet and a second pump outlet;
    a pressure regulator valve defining a first chamber in fluid communication with the first pump outlet and a second chamber in fluid communication with the second pump outlet, wherein the pressure regulator valve is configured to selectively connect the first chamber with a first pressure line operating at a first greater-than-zero pressure and to selectively connect the second chamber to a second pressure line operating at a second greater-than-zero pressure, wherein the pressure regulator valve further comprises:
    an elongate housing; and
    an axially slidable spool that is axially slidable within the elongate housing to selectively connect the first chamber with the first pressure line operating at the first greater-than-zero pressure and to selectively connect the second chamber to the second pressure line operating at the second greater-than-zero pressure, wherein the first chamber is defined within the elongate housing and between a first land and second land of the axially slidable spool, and wherein the second chamber is defined within the elongate housing and between a third land and a fourth land of the axially slidable spool.

2. The system of claim 1, wherein the elongate housing further defines a first exhaust port in communication with the first greater-than-zero pressure line, and wherein the position of the axially slidable spool selectively connects the first chamber with the first exhaust port.

3. The system of claim 2, wherein the elongate housing further defines a second exhaust port in communication with the second greater-than-zero pressure line, and wherein the position of the axially slidable spool selectively connects the second chamber with the second exhaust port.

4. The system of claim 1, further comprising a ball-check valve selectively connecting the second pump outlet in fluid communication with the first chamber.

5. The system of claim 1, wherein the pressure regulator valve is configured to selectively connect the first chamber with the second pressure line operating at the second greater-than-zero pressure.

6. The system of claim 1, wherein the pressure regulator valve is configured to selectively connect the first chamber with a transmission sump.

7. A transmission including a dual pressure pump system comprising:
    a dual pressure pump having a first pump outlet and a second pump outlet;
    a pressure regulator valve defining a first chamber in fluid communication with the first pump outlet and a second chamber in fluid communication with the second pump outlet, wherein the pressure regulator valve is configured to selectively connect the first chamber with a first pressure line operating at a first greater-than-zero pressure and to selectively connect the second chamber to a second pressure line operating at a second greater-than-zero pressure, wherein the pressure regulator valve further comprises:
    an elongate housing; and
    an axially slidable spool that is axially slidable within the elongate housing to selectively connect the first chamber with the first pressure line operating at the first greater-than-zero pressure and to selectively connect the second chamber to the second pressure line operating at the second greater-than-zero pressure, wherein the first chamber is defined within the elongate housing and between a first land and second land of the axially slidable spool, and wherein the second chamber is defined within the elongate housing and between a third land and a fourth land of the axially slidable spool.

8. The transmission of claim 7, wherein the elongate housing further defines a first exhaust port in communication with the first greater-than-zero pressure line, and wherein the position of the axially slidable spool selectively connects the first chamber with the first exhaust port.

9. The transmission of claim 8, wherein the elongate housing further defines a second exhaust port in communication with the second greater-than-zero pressure line, and wherein the position of the axially slidable spool selectively connects the second chamber with the second exhaust port.

10. The transmission of claim 7, further comprising a ball-check valve selectively connecting the second pump outlet in fluid communication with the first chamber.

11. The transmission of claim 7, wherein the pressure regulator valve is configured to selectively connect the first chamber with the second pressure line operating at the second greater-than-zero pressure.

12. The transmission of claim 7, wherein the pressure regulator valve is configured to selectively connect the first chamber with a transmission sump.

13. A propulsion system for a vehicle comprising:
    a dual pressure pump having a first pump outlet and a second pump outlet;
    a pressure regulator valve defining a first chamber in fluid communication with the first pump outlet and a second chamber in fluid communication with the second pump outlet, wherein the pressure regulator valve is configured to selectively connect the first chamber with a first pressure line operating at a first greater-than-zero pressure and to selectively connect the second chamber to a second pressure line operating at a second greater-than-zero pressure, wherein the pressure regulator valve further comprises:

an elongate housing; and an axially slidable spool that is axially slidable within the elongate housing to selectively connect the first chamber with the first pressure line operating at the first greater-than-zero pressure and to selectively connect the second chamber to the second pressure line operating at the second greater-than-zero pressure, wherein the first chamber is defined within the elongate housing and between a first land and second land of the axially slidable spool, and wherein the second chamber is defined within the elongate housing and between a third land and a fourth land of the axially slidable spool.

14. The system of claim 13, wherein the elongate housing further defines a first exhaust port in communication with the first greater-than-zero pressure line, and wherein the position of the axially slidable spool selectively connects the first chamber with the first exhaust port.

\* \* \* \* \*